United States Patent [19]
Olson et al.

[11] Patent Number: 5,937,982
[45] Date of Patent: Aug. 17, 1999

[54] SYNCHRONIZER INCLUDING AXIALLY-MOVEABLE SELF-ENERGIZING MEMBER

[75] Inventors: Otis J. Olson, Farmington Hills; Eugene R. Braun, Royal Oak, both of Mich.

[73] Assignee: Eaton Corporation, Cleveland, Ohio

[21] Appl. No.: 08/908,093

[22] Filed: Aug. 11, 1997

[51] Int. Cl.[6] .................................................. F16D 23/06
[52] U.S. Cl. ................................ 192/53.31; 192/53.331; 74/339
[58] Field of Search ..................... 192/53.31, 53.331, 192/53.332, 53.33; 74/339

[56] References Cited

U.S. PATENT DOCUMENTS

| | | | |
|---|---|---|---|
| 1,923,386 | 8/1933 | Murray | 192/53.31 |
| 2,978,083 | 4/1961 | Henyon | 192/53.332 X |
| 4,869,353 | 9/1989 | Ohtsuki et al. | 192/53.31 |
| 5,078,245 | 1/1992 | Nellums et al. | 192/53.332 |
| 5,092,439 | 3/1992 | Reynolds | 192/53.331 |

FOREIGN PATENT DOCUMENTS

| | | | |
|---|---|---|---|
| 1098824 | 2/1961 | Germany | 74/339 |

*Primary Examiner*—Charles A. Marmor
*Assistant Examiner*—Scott Lund
*Attorney, Agent, or Firm*—Paul S. Rulon; Howard D. Gordon

[57] ABSTRACT

A pin-type, double acting synchronizer (22) with friction clutches (26,50 and 28,52), jaw clutches (30,34 and 32,36), a shift flange (42), self-energizing ramps (13b,13c,13d,13e) affixed to a shaft (12), and self-energizing ramps (45a,45b, 45c,45d) affixed to a self-energizer member (44). Engagement of the ramps provides an additive axial force ($F_a$) for increasing the engagement force of the friction clutches. The member (44) is secured for rotation with and sliding movement relative to the flange (42). Spring washers (46,48) react in opposite directions between member (44) and the jaw members (34,36) for limiting the amount of additive axial force ($F_a$).

19 Claims, 3 Drawing Sheets

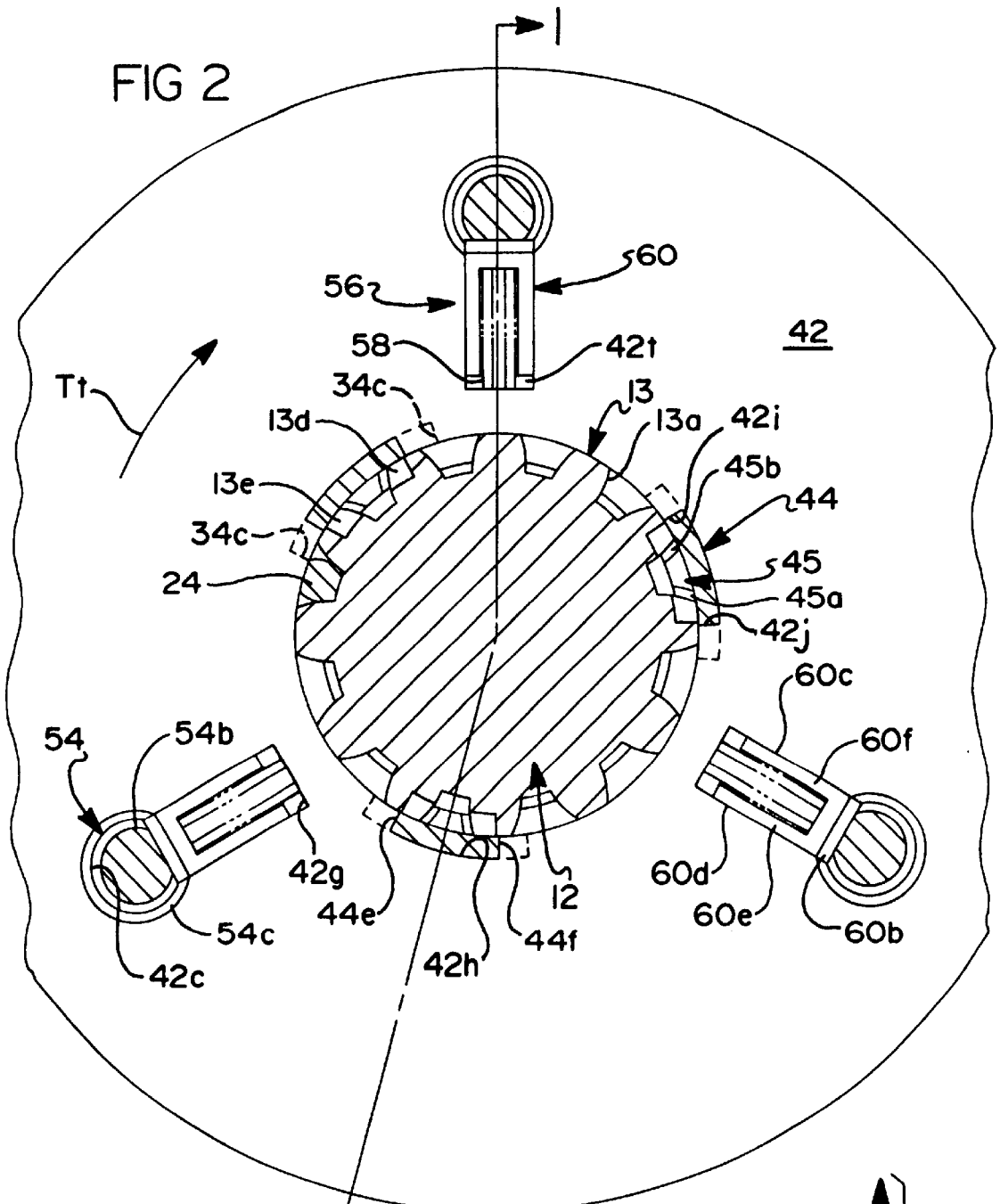

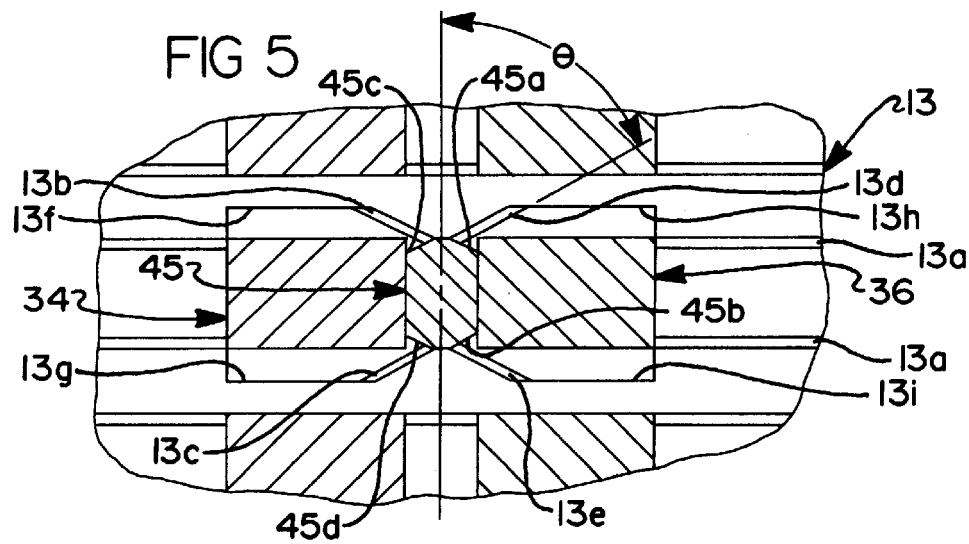
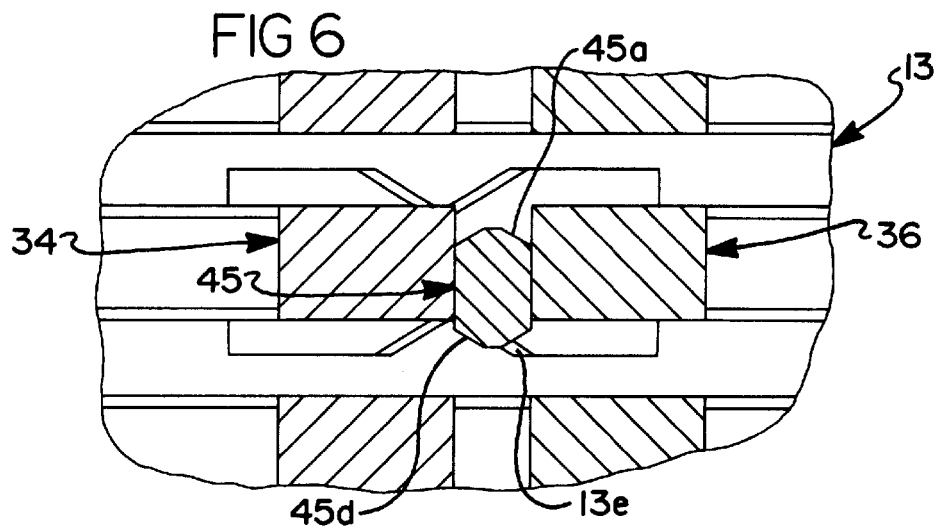
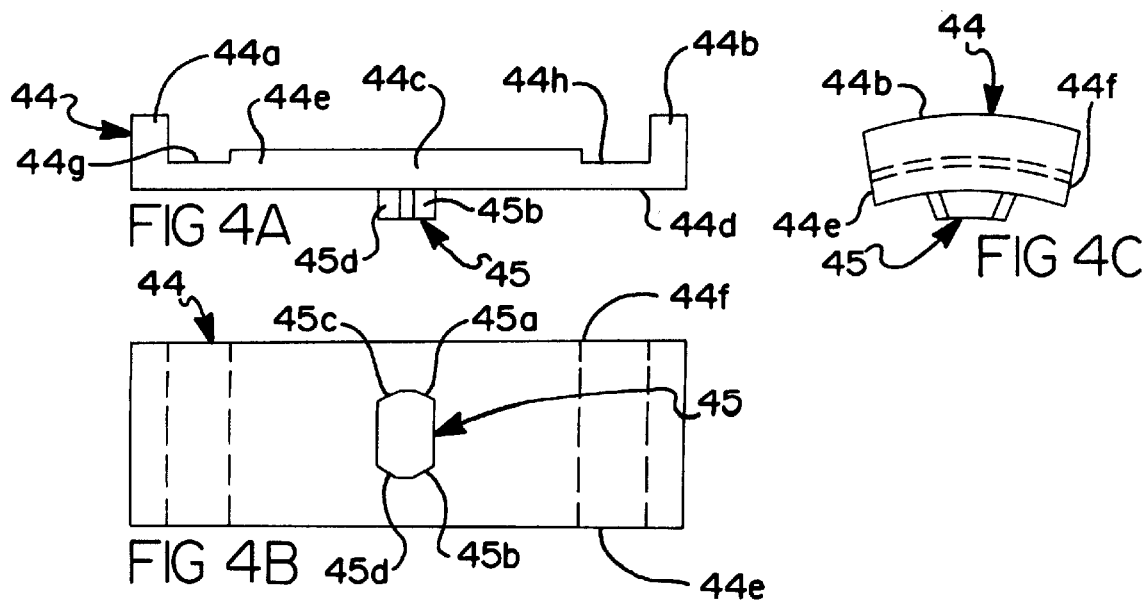

SYNCHRONIZER INCLUDING AXIALLY-MOVEABLE SELF-ENERGIZING MEMBER

CROSS-REFERENCE TO RELATED APPLICATION

This application, having attorney docket number 94-rELT-154, relates to U.S. application Ser. Nos. 08/908,091; 08/908,087; 08/908,086; 08/908,092; 08/908,090; filed Aug. 11, 1997, and respectively having attorney docket numbers 95-rELT-217, 95-rTRN-406, 91-TRN-499, and 94rELT-247, 97-rTRN-259, and all assigned to the assignee of this application.

FIELD OF THE INVENTION

This invention relates to a synchronizer for a transmission.

BACKGROUND OF THE INVENTION

It is well known that synchronizers may be used in multiple speed ratio transmissions to assist shifting of all or some of the transmission gear ratios. It is also known that the shift effort and/or time to perform a shift may be reduced by use of synchronizers of the self-energizing or boost type. Since required operator shift effort generally increases with vehicle size, synchronizers of the self-energizing type are especially useful in transmissions for heavy duty trucks and/or in transmissions where reduced shift time and/or reduced shift effort are preferred. Prior art examples of synchronizers that may be relevant to the synchronizer herein may be seen by reference to U.S. Pat. No. 5,078,245; 5,092,439; and German Patent Publication 1,098,824 which are incorporated herein by reference.

SUMMARY OF THE INVENTION

An object of this invention is to provide a synchronizer with improved means to limit the force of self-energizing means.

According to the invention, a synchronizer is selectively operative to frictionally synchronize and positive connect a first drive mounted for rotation about an axis of a second drive. The synchronizer includes a first jaw member affixed to the first drive and engagable with an axially movable second jaw member in response engaging movement thereof by an axial shift force ($F_o$). The second jaw member is mounted for non-rotation and for axial movement relative to the second drive. A first friction member is secured for rotation with the first drive and a second friction member is axially movable into frictional engagement with the first friction member to provide a synchronizing torque between the drives in response to the engaging movement. A shift member is for axially moving the second jaw member and the second friction member into said engagements in response to the shift force ($F_o$) applied to the shift member. Blocker means are movable into engagement in response to the engaging movement of the second jaw member for preventing asynchronous engagement of the jaw members and for transmitting the shift force ($F_o$) to the engaged friction members. First and second self-energizing means are operative when engaged to react the synchronizing torque for producing an additive force ($F_a$) in the direction of the shift force ($F_o$) for increasing the engagement force of the engaged friction members. The first self-energizing means is affixed against movement relative to the second drive. Resilient means are for limiting the force of the additive force ($F_a$). The improvement comprises the second self-energizing means being affixed to a self-energizing member mounted for axial movement relative to the shift member, and the resilient means flexibly reacting between the self-energizing member and the shift member and being operative to flex in response to the engagement of the self-energizing means for limiting the additive force ($F_a$) in the direction of the shift force ($F_o$).

BRIEF DESCRIPTION OF THE DRAWINGS

The synchronizer of the invention is shown in the accompanying drawings in which:

FIG. 2 illustrates the synchronizer of FIG. 1 sectioned along line 2—2 of FIG. 1;

FIG. 3 illustrates an enlarged view of part of a pin component in FIGS. 1 and

FIGS. 4A, 4B, 4C are enlarged views of a component in FIGS. 1 and 2;

FIGS. 5 and 6 illustrate an enlarged self-energizing component in FIGS. 1 and 2; and FIG. 7 is a graphical representation of axial forces and torques acting on a shift flange of the synchronizer.

Figure 1:
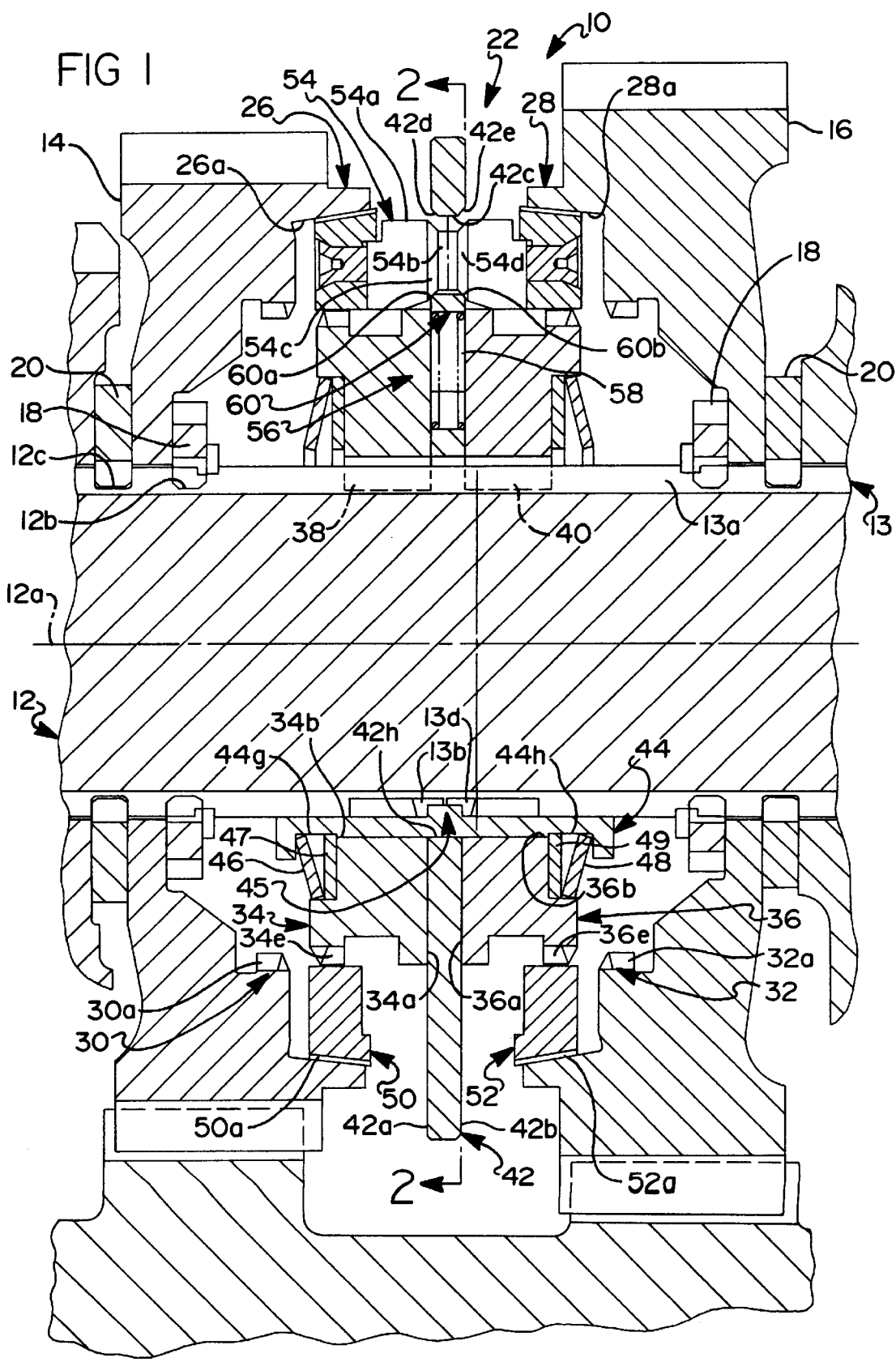
FIG. 1 illustrates a double-acting synchronizer in a neutral position and sectioned along line 1—1 of FIG. 2.

The drawings are simplified by omitting background lines of several components therein.

DETAILED DESCRIPTION OF THE DRAWINGS

The term "synchronizer", used herein, shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" or "boost" shall designate a synchronizer clutch mechanism which includes ramps or cams or the like to increase the engaging force of the synchronizing friction clutch in relation to the synchronizing torque of the friction clutch.

Looking now at the drawings therein is shown in detail a gear and synchronizer assembly 10 including a shaft 12 mounted for rotation about a central axis 12a, axially spaced apart gears 14,16 rotatably supported on the shaft and secured against axial movement relative to the shaft by annular thrust members 18,20 and a double-acting synchronizer clutch mechanism 22. Thrust members 18,20 are axially retained in annular grooves 12b, 12c in spine teeth 13 of the shaft and are affixed against rotation relative to the shaft by a retainer pin 24 (FIG. 2) disposed in a space between two of the teeth 13.

The synchronizer mechanism 22 includes annular friction member portions 26,28 and jaw clutch member portions 30,32 integrally formed with gears 14,16, jaw clutch members 34,36 having internal spline teeth 38,40 slidably mating with the external spline teeth 13 integrally formed with shaft 12 or otherwise affixed thereto, a radially extending shift flange or member 42 having axially oppositely facing sides 42a, 42b sandwiched between axially facing surfaces 34a, 36a of the jaw members 34, 36, three self-energizer members 44 explained further hereinafter, spring washers 46, 48, annular friction members or rings 50, 52 secured together by three circumferentially spaced apart pins 54 extending axially from each of the friction members and through openings 42c in the flange and three pre-energizer and neutral centering assemblies 56. Each pre-energizer assembly includes a spring 58 and a plunger 60 which reacts with surfaces defined by the pins. Also, the number of self-energizer members 44, pins 54 and assemblies 56 may be more or less than disclosed herein. The pre-energizer assemblies may be other than the type shown herein for example, they may be of the split pin type. Further, the synchronizer mechanism may be other than of the pin-type, for example, the synchronizer mechanism may be of the so called baulkring type, e.g.,such as disclosed in U.S. Pat. No. 5,544,727 which is incorporated herein by reference.

As is readily seen, friction members 26, 50 and 28, 52 pair up to define friction clutches for synchronizing the gears to the shaft prior to engagement of the jaw clutches. Cone clutches are preferred; however, other types of friction clutches may be used. Friction members 26,28 may be affixed to the associated gears in any of several known ways. Friction members 26,28 have internal cone friction surfaces 26a, 28a which respectively mate with external cone friction surfaces 50a, 52c.

The friction surfaces and/or 26a, 28a may be defined by any of several known friction materials affixed to the base member, for example, pyrolytic carbon friction materials, such as disclosed in U.S. Pat. Nos. 4,700,823; 4,844,218; and 4,778,548 may be used. These patents are incorporated herein by reference.

Pins 54 are shown in greater detail in FIG. 3. Each pin includes major diameter portions 54a having diameters slightly less than the diameter of flange openings 42c, a reduced diameter or groove portion 54b spaced between friction rings 50,52 (herein midway), conical blocker shoulders or surfaces 54c,54d extending radially outward from the pin axis and axially away from each other at angles herein of about forty degrees relative to a line normal to the pin axis, and preferably, but not necessarily, independent pre-energizer surfaces 54e, 54f and extended secondary centering surfaces 54g, 54h. The grooved portions, when disposed within their respective flange openings, allow limited rotation of the rigid friction ring and pin assembly relative to the flange to effect engagement of the pin blocker shoulders with chamfered blocker shoulders 42d, 42e defined about the flange openings. The pre-energizer surfaces 54e, 54f chordally intersect or remove a portion of conical blocker shoulders 54c, 54d, are preferably (but not necessarily) flat planar surfaces and form angles relative to the pin axis which are somewhat less than the angles of the blocker surfaces. Centering surfaces 54g, 54h are also flat planar surfaces and as is readily apparent in the drawings, form angles relative to the pin axis which are substantially less than the angles of the blocker and pre-energizer surfaces. As disclosed herein, the chordal extents of the flat surfaces are tangent to circles concentric to the pin axis and the shaft axis. Axial forces provided by the secondary centering surfaces should be sufficient to return flange 42 to its neutral position in the event that such positioning has not been completely effected by the shift mechanism for moving the flange.

Plungers 60 are biased radially outward toward the pin pre-energizer and centering surfaces by the helical compression springs 58 disposed in slots 42f of the flange. The major extents of the slots preferably, but not necessarily, extend radially relative to the shaft axis. The slots also extend axially through the flange sides 42a, 42b, into flange openings 42c, and have ends 42g at their radially inward extent for the springs to react against. The radially inner portion of the springs may be retained by unshown means such as pegs extending radially outward from the slot ends. Plungers 60, may be formed of a sheet metal material, but are preferably formed of a cast or compacted material such as steel to provide structural rigidly and surface hardness. Each plunger 60 has a somewhat U-shaped cross-section with a closed end defining a head portion having flat angled surfaces 60a, 60b for cooperating with the flat pre-energizer and centering surfaces of the associated pins 54. The sidewalls of each plunger have surfaces 60c, 60d for slidably cooperating with the radially extending sidewall surfaces of the slot 42f to retain the plunger in the circumferential direction. The plunger sidewalls also have axially oppositely facing surfaces 60e for slidably cooperating with the axially facing, radially extending end surfaces 34a, 36a of jaw members 34, 36 to retain the plunger in the axial direction.

As previously mentioned, jaw members 34,36 include internal spline teeth 38,40 slidably mating with external spline teeth 13 affixed to the shaft. The external splines have involute flank surfaces 13a extending parallel to the shaft axis, and the mating thereof with flank surfaces of the jaw member splines prevents relative rotation therebetween. The self-energizer members 44, as best seen in FIGS. 1, 2 and 4A–4C, each include end portions 44a, 44b, an arcuate center portion 44c with a radially inwardly facing surface 44d having a self-energizing ramp assembly 45 extending radially inward therefrom and circumferentially oppositely facing surfaces 44e, 44f. The center portion 44c extends through axially aligned opening 34b, 36b in the jaw members and through an opening 42h in a radially inner extent of flange 42. The self-energizing member 44 is axially slidable relative to the jaw members 34, 36 and flange 42, is retained against circumferential movement relative to the flange by the surfaces 44e, 44f which closely abut circumferentially facing shoulders 42i, 42j of flange opening 42h, and is free to rotate a limited amount in the jaw member openings 34b, 36b until surfaces 44e, 44f contact circumferentially facing shoulders 34c of the jaw member openings 34b, 36b. The shoulders 34c of jaw member 34 are shown in phantom lines in FIG. 2. Spring washers 46, 48 are maintained in a preloaded state against jaw members 34, 36 by the self-energizer member end portions 44a, 44b and antifriction thrust washers 47, 49 which react against axially opposite ends of the jaw members 34, 36. The inside diameter of the thrust washers 47, 49 are received in annular recesses 44g, 44h in each self-energizer member 44 and are prevented from axial movement toward each other by a shoulder of each recess for maintaining the preloaded state of one spring when the other spring is compressed by self-energizing forces. Alteratively, the springs may not be preloaded and/or the thrust washers 47,49 may not be restrained against axial movement.

As explained hereinafter, a principle function of members 44 and spring washers 46, 48 is to limit the amount of an additive axial self-energizing force $F_a$ provided by ramp assembly 45. However, herein they may also retain the jaw members 34, 36 against axial movement relative to shift flange 42. Other means may be used to axially retain the jaw members 34, 36, e. g., the H-shaped retainer members in previously mentioned U. S. Pat. No. 5,092,439.

As best seen in FIGS. 1, 2, 5 and 6, portions of the shaft external teeth 13 are modified to provide one or more self-energizing ramp surfaces which cooperate with a like number of ramp surfaces defined by ramp assembly 45 of member 44. The ramp assembly and the ramp surfaces thereon extend radially inward between the axially extending spaces between shaft splines 13. The ramp surfaces allow limited rotation of the self-energizing member 44 and flange 42 relative to jaw members 34, 36 and shaft 12, and react synchronizing torque between the cone clutches and shaft to provide the additive axial self-energizing force $F_a$ for increasing the engaging force of the cone clutch engaged through the blocker shoulders by an operator shift force $F_o$ applied to flange 42, thereby increasing the synchronizing torque provided by the cone clutch. Ramp surfaces may be provided for increasing synchronizing force for one or both gears and/or for increasing synchronizing force in response to torque in either direction, as is encountered for up and down shifts. More specifically, pairs of axially facing flank surfaces 13a of splines 13 have portions removed to provide self-energizing ramp or boost surfaces 13b, 13c, 13d, 13e and axially extending surfaces 13f, 13g, 13h, 13i. Self-energizing ramp or boost surfaces 13b, 13c respectively react against self-energizing ramp or boost surfaces 45a, 45b on ramp assembly 45 to provide the additive axial forces to increase or assist the synchronization rate of gear 14 in response to torque in either direction. Ramp surfaces 13d, 13e respectively react against ramp surfaces 45c, 45d to provide the additive axial forces for gear 16 in response to synchronizing torque in either direction. The angles of the ramp surfaces may be varied to provide different amounts of additive axial force for up and down shifts and for high and low speed ratios. Also, if no additive axial force is preferred in one direction for one gear or more, the ramp surfaces may be parallel to the spline, i.e., no effective ramp surfaces are provided. The magnitude or amount of the axial additive forces, as explained further hereinafter, is also a function of the mean radii ratio of friction clutches and self-energizing ramps. Accordingly, the magnitude of the additive forces for a given shift force $F_o$ applied to shift flange 42 by a shift fork may be varied by varying the ramp angles and/or the mean radii ratio.

When the flange 42 is in the neutral position of FIGS. 1 and 5, reduced diameter portions 54b of pins 54 are radially aligned with their associated flange openings 42c, and friction surfaces of the cone clutches are slightly spaced apart and are maintained in this spaced relation by angled pre-energizer surfaces 60a, 60b of the plungers 60 acting on pre-energizer surfaces 54e, 54f of pins 54 by the force of springs 58. The axial force provided by the pre-energizer surfaces are preferably sufficient to counter act any additive axial force on flange 42 by the self-energizing ramps due to viscous shear of oil between the cone clutch surfaces. When it is desired to couple either gear to the shaft, an appropriate and unshown shift mechanism, such as disclosed in U.S. Pat. No. 4,920,815 and incorporated herein by reference, is connected to the outer periphery of flange 42 in known manner for moving the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 42 in an axial direction and is represented by the length of arrow $F_o$ in FIG. 7.

Initial rightward axial movement of flange 42 by the operator shift force $F_o$ is transmitted to the pins by pre-energizer surfaces 60b to effect initial frictional engagement of cone surface 52a with cone surface 28a. The initial engagement force of the cone surface is of course a function of the force of springs 58 and the angles of the pre-energizer surfaces. The initial frictional engagement (provided an asynchronous condition exists and momentarily ignoring the effect of the self-energizing ramps) produces an initial cone clutch engaging force and synchronizing torque which ensures limited relative rotation between flange 42 and the engaged friction ring, and hence, movement of the reduced diameter pin portion 54b to the appropriate sides of the flange openings 42c to provide engagement of pin blocker shoulders 54c with flange blocker shoulders 42d. When the blocker shoulders are engaged, the full operator shift force $F_o$ on flange 42 is transmitted to friction ring 52 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 7. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 42c to allow continued axial movement of the flange and engagement of the external jaw teeth 36e of jaw member 36 with internal jaw teeth 32a of jaw member 32, thereby completing a shift into gear 16. Axial movement of the flange 42 to the left to synchronize and positive clutch gear 14 to shaft 12 is analogous to the above and the shift is completed when jaw teeth 34e of jaw member 34 mates with teeth 30a of jaw member 30. The spline/jaw teeth may be configured as shown in U.S. Pat. Nos. 3,265,171 and 4,246,993 which are incorporated herein by reference.

Still ignoring the effects of the self-energizing ramps, cone clutch torque provided by the force $F_o$ is expressed by equation (1).

$$T_o = F_o R_c \mu_c / \sin \alpha \qquad (1)$$

where:

$R_c$=the mean radius of the cone friction surface, $\mu_c$=the coefficient of friction of the cone friction surface, and $\alpha$=the angle of the cone friction surfaces.

Looking now at the affects of the self-energizing ramp surfaces, the synchronizing torque $T_o$, due to the operator applied axial shift force $F_o$, is of course transmitted to flange 42 by pins 54 and is reacted to shaft 12 across the self-energizing ramp surfaces. The self-energizing ramp surfaces, when engaged, produce the axial additive force $F_a$ acting on the flange in the same direction as shift force $F_o$. The axial additive force $F_a$ is applied to the engaged friction surfaces through the blocker surfaces via a force path including the engaged self-energizing ramp surfaces, the self-energizing member 44, either spring washer 46 or 48, and axially against the flange 42 via either jaw members 34, 36. The spring washers allow sufficient axial movement of the self-energizer member 44 for the engaged self-energizing ramp surfaces 45a, 45b, 45c, or 45d to move into a force balance position at the intersection of self-energizing ramp surfaces 13b, 13c, 13d, or 13e with axially extending surfaces 13f, 13g, 13h, or 13i. When in this force balance position, the maximum additive axial force $F_a$ is limited to the force transmittable by the spring at the balance position since any additional movement of the self-energizing ramp surfaces 45a, 45b, 45c, or 45d on to the axially extending surfaces generates no additive axial force. The forces $F_o$ and $F_a$ are applied to shift flange 42 in parallel and sum to provide a total force $F_t$, thereby further increasing the engaging force of the cone clutch to provide an additive synchronizing torque $T_a$ which adds to the torque $T_o$ to provide a total torque $T_r$. The sum of the axial forces for engaging the cone clutch are $F_o$ plus $F_a$ and the sum of the synchronizing torques being produced by the cone clutch are $T_o$ plus $T_a$, as graphically shown in FIG. 7.

The main variables and equations for calculating self-energizing ramp angles may be seen by reference to previously mentioned U.S. Pat. No. 5,092,439.

A pin-type synchronizer embodiment has been disclosed to illustrate inventive subject matter herein. The following claims are intended to cover inventive portions of the disclosed subject matter and variations and modifications believed to be within the spirit of the invention.

What is claimed is:

1. A synchronizer selectively operative to frictionally synchronize and positively connect a first drive mounted for rotation about an axis of a second drive; the synchronizer including:

a first jaw member affixed to the first drive and engagable with an axially movable second jaw member in response to an engaging movement thereof by an axial shift force ($F_o$), the second jaw member mounted for non-rotation and for axial movement relative to the second drive;

a first friction member secured for rotation with the first drive and a second friction member axially moveable into frictional engagement with the first friction member to provide a synchronizing torque between the drives in response to the engaging movement;

a shift member for axially moving the second jaw member and the second friction member into said engagements in response to the shift force ($F_o$) applied to the shift member;

blocker means movable into engagement in response to the engaging movement of the second jaw member for preventing asynchronous engagement of the jaw members and for transmitting the shift force ($F_o$) to the engaged friction members;

first and second self-energizing means operative when engaged to react the synchronizing torque for producing an additive force ($F_a$) in a direction of the shift force ($F_o$) for increasing an engagement force of the engaged friction members, the first self-energizing means affixed against movement relative to the second drive;

resilient means for limiting a magnitude of the additive force ($F_a$);

the improvement comprising:

second self-energizing means affixed to a self-energizing member mounted for axial movement relative to the second jaw member; and the resilient means flexibly reacting between the self-energizing member and the second jaw member and operative to flex in response to engagement of the fist and second self-energizing means for limiting the additive force ($F_a$) in the direction of the shift force ($F_o$).

2. The synchronizer of claim 1, wherein:

the shift member is a radially extending flange;

the self-energizing member includes a first portion axially spaced from the second jaw member; and the resilient means includes resilient compression means interposed between the portion and the second jaw member.

3. The synchronizer of claim 2, wherein:

the portion and the resilient compression means are positioned to retain the second jaw member against axial movement relative to the flange.

4. The synchronizer of claim 2, wherein:

the second jaw member and the flange include axially aligned openings receiving the self-energizing member for non-rotation relative to the flange, for allowing limited rotation relative to the second jaw member and for allowing the axial movement of the self-energizing member relative to the flange and the second jaw member.

5. The synchronizer of claim 4, wherein:

the second drive includes external splines slidably mating with internal splines of the second jaw member; and the self-energizing member is retained in a radially inward direction by the external splines.

6. The synchronizer of claim 5, wherein:

portions of the external splines define the first self-energizing means and the second self-energizing means extend radially inward from the self-energizing member.

7. A synchronizer selectively operative to frictionally synchronize and positively connect either of first and second drives respectively mounted for relative rotation about an axis of a shaft; the synchronizer including:

first and second jaw members affixed respectively to the first and second drives and respectively engagable with axially movable third and fourth jaw members in response to an engaging movement thereof by an axial bi-directional shift force ($F_o$), the third and fourth jaw members mounted for non-rotation and for axial movement relative to the shaft;

first and second friction members respectively secured for rotation with the first and second drives, and third and fourth friction members axially movable into frictional engagement respectively with the first and second friction members to provide a synchronizing torque between the drives and the shaft in response to the engaging movement;

a shift member for axially moving the third and fourth jaw members and the third and fourth friction members into said engagements in response to the bi-directional shift force ($F_o$) applied to the shift member;

blocker means movable into engagement in response to the engaging movement of either of the third and fourth jaw members for preventing asynchronous engagement of the jaw members and for transmitting the shift force ($F_o$) to the engaged friction members;

first and second self-energizing means operative when engaged to react the synchronizing torque for producing an additive force ($F_a$) in a direction of the shift force ($F_o$) for increasing an engagement force of the engaged friction members, the first self-energizing means affixed against movement relative to the shaft;

resilient means for limiting a magnitude of the additive force ($F_a$);

the improvement comprising:

the second self-energizing means affixed to a self-nergizing member mounted for axial movement relative to the thrid and fourth jaw members; and the resilient means biasing the self-energizing member axially in opposite directions and operative to flex in response to an engagement of the first and second self-energizing means for limiting the additive force ($F_a$) in the direction of the bi-directional shift force.

8. The synchronizer of claim 7, wherein:

the third and fourth jaw members are separate jaw members; and the shift member is a radially extending flange having axially oppositely facing sides positioned between the third and fourth jaw members.

9. The synchronizer of claim 8, wherein:

the self-energizing member includes first and second portions axially spaced respectively from the third and fourth jaw members; and the resilient means include first and second resilient compression means interposed respectively between the first and second portions and the third and fourth jaw members.

10. The synchronizer of claim 9, wherein:

the first and second portions and the resilient compression means are positioned to retain the third and fourth jaw members against axial movement relative to the flange.

11. The synchronizer of claim 8, wherein:

the third and fourth jaw members and the flange each include axially aligned openings receiving the self-energizing member for non-rotation relative to the flange for allowing rotation relative to the third and fourth jaw members and for allowing the axial movement of the selfenergizing member relative to the flange and the third and fourth jaw members.

12. The synchronizer of claim 11, wherein:

the shaft includes external splines slidably mating with internal splines of the third and fourth jaw members; and the self-energizing member is retained in a radially inward direction by the external splines.

13. The synchronizer of claim 12, wherein:

portions of the external splines define the first self-energizing means, and the second self-energizing means extend radially inward from the self-energizing member.

14. A synchronizer selectively operative to frictionally synchronize and positively connect either of first and second drives respectively mounted for relative rotation about an axis of a shaft; the synchronizer including:

first and second jaw members affixed respectively to the first and second drives and respectively engagable with axially movable third and fourth jaw members in response to an engaging movement thereof by an axial bi-directional shift force ($F_o$), the third and fourth jaw members mounted for non-rotation and for axial movement relative to the shaft;

first and second friction members respectively secured for rotation with the first and second drives and third and fourth friction members axially movable into frictional engagement respectively with the first and second friction members to provide a synchronizing torque between the drives and the shaft in response to the engaging movement;

a radially extending flange having axially oppositely facing sides positioned between the third and fourth jaw members and between the third and fourth friction members for axially moving the jaw members and friction members into said engagements in response to the bidirectional shift force ($F_o$) applied to the flange;

blocker means movable into engagement in response to the engaging movement of either of the third and fourth jaw members for preventing asynchronous engagement with the first and second jaw members and for transmitting the shift force ($F_o$) to the engaged friction members for increasing an engagement force thereof, the blocker means including a plurality of circumferentially spaced apart pins rigidly extending axially between the third and fourth friction members and into a first set of openings in the flange, each of the pins having blocker shoulders engagable with a blocker shoulder defined about an associated one of the openings;

first and second self-energizing means operative when engaged to react the synchronizing torque for producing an additive force ($F_a$) in a direction of the shift force ($F_o$) and for increasing the engagement force of the engaged friction members, the first self-energizing means affixed against movement relative to the shaft;

resilient means for limiting a magnitude of the additive force ($F_o$); the improvement comprising:

the second self-energizing means affixed against movement relative to a self-energizing member mounted for non-rotation and for axial movement relative to the flange and for limited rotation and axial movement relative to the third and fourth jaw members; and the resilient means biasing the self-energizing member axially in opposite directions and operative to flex in response to an engagement of the first and second self-energizing means for limiting the additive force ($F_a$) in the direction of the bi-directional shift force.

15. The synchronizer of claim 14, wherein:

the self-energizing member includes first and second portions axially spaced respectively from the third and fourth jaw members; and the resilient means include first and second resilient compression means interposed respectively between the first and second portions and the third and fourth jaw members.

16. The synchronizer of claim 15, wherein:

the first and second portions and the resilient compression means are positioned to retain the third and fourth jaw members against axial movement relative to the flange.

17. The synchronizer of claim 14, wherein:

the third and fourth jaw members and the flange each include axially aligned openings receiving the self-energizing member for the non-rotation relative to the flange, for allowing the limited rotation relative to the third and fourth jaw members, and for allowing the axial movement of the self-energizing member relative to the flange and the third and fourth jaw members.

18. The synchronizer of claim 17, wherein:

the shaft includes external splines slidably mating with internal splines of the third and fourth jaw members; and the self-energizing member is retained in the radially inward direction by the external splines.

19. The synchronizer of claim 18, wherein:

portions of the external splines define the first self-energizing means, and the second self-energizing means extend radially inward from the self-energizing member.

* * * * *